Nov. 17, 1931.  F. T. EVERSON  1,832,829
TRUCK WHEEL GUARD
Filed Jan. 13, 1927
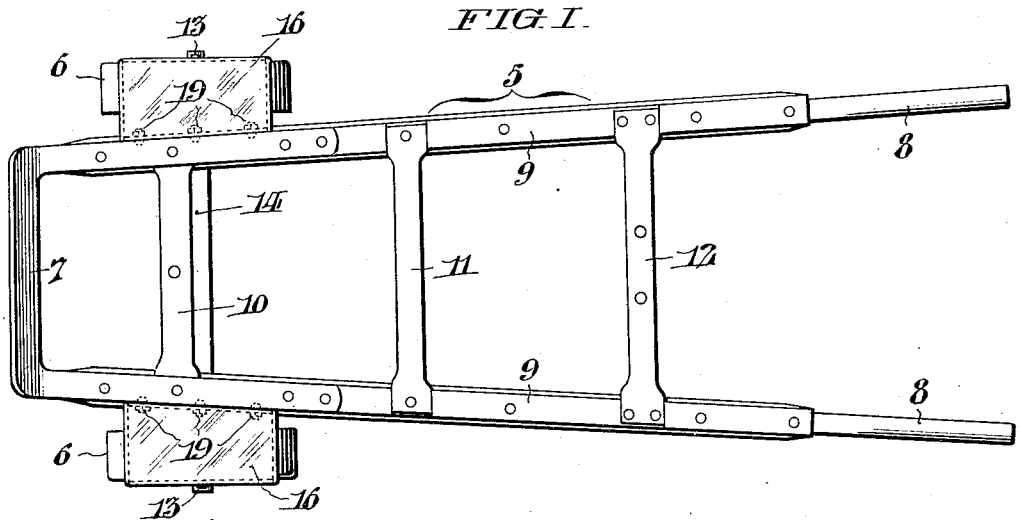
FIG. I.
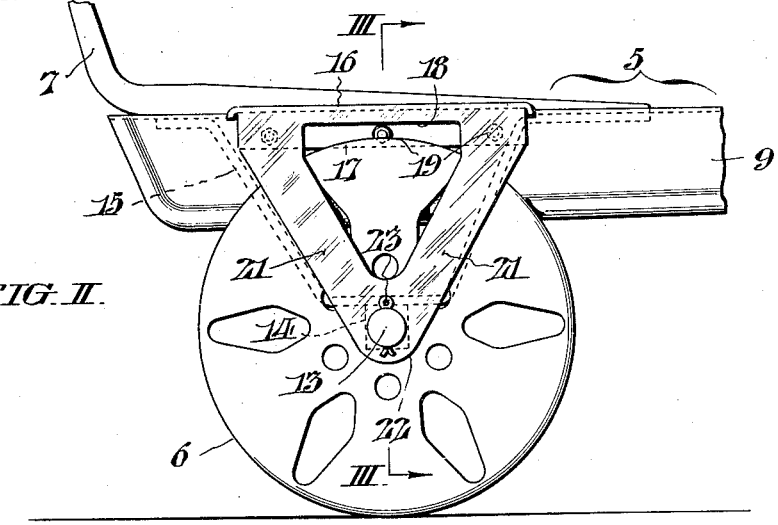
FIG. II.
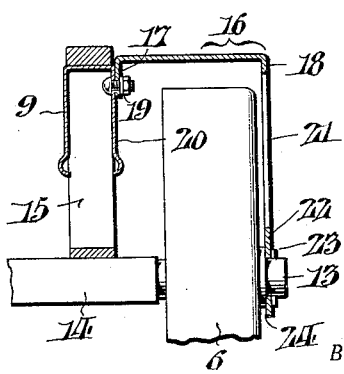
FIG. III.
WITNESSES
John A. Weidler
Frederick A. Kraus
INVENTOR:
Frank T. Everson,
BY
ATTORNEYS.

Patented Nov. 17, 1931

1,832,829

UNITED STATES PATENT OFFICE

FRANK T. EVERSON, OF FOLCROFT, PENNSYLVANIA, ASSIGNOR TO THE AMERICAN PULLEY COMPANY, OF PHILADELPHIA, PENNSYLVANIA, A CORPORATION OF PENNSYLVANIA

TRUCK WHEEL GUARD

Application filed January 13, 1927. Serial No. 160,797.

My invention relates to truck wheel guards for the wheels of hand trucks such as are commonly used for moving and shifting freight, baggage, packages, and bulky or heavy articles of various kinds. I aim to provide a simple, rugged, and inexpensive guard, that may be readily applied to existing trucks as well as to new-built ones. How these and other advantages can be realized through the invention will appear from the description hereinafter of a selected and preferred embodiment. The embodiment here shown represents a sheet metal type of construction, which is especially adaptable to the purposes of the invention.

In the drawings, Fig. I is a plan view of a truck equipped with wheel guards conveniently embodying my invention.

Fig. II is a fragmentary side view of the forward end of the truck.

Fig. III is a fragmentary vertical sectional view through one side of the truck frame and the corresponding wheel guard, taken as indicated by the lines III—III in Fig. II.

The truck here shown is of an ordinary type, comprising a frame 5 having wheels 6, 6 with an upstanding nose piece 7 at one end, and handles 8, 8 at the other end. The frame 5 comprises diverging side members or sills 9, 9 of channel section, united by the nose 7 and by cross members 10, 11, 12. The wheels 6, 6 are mounted, as usual, on axles 13, 13 formed by the rounded ends of a transverse axle bar 14, which is carried by brackets 15, 15 attached to the side members 9, 9.

The wheel guards 16, 16, with which my present invention is more particularly concerned, are mounted at the forward end of the frame 5, directly over the wheels 6, 6. As here shown, they consist of flat sheet metal plates extending fore and aft of the truck, substantially in the plane of the top surfaces of its side members 9, 9. The outer edges of these guard plates 16, 16 extend parallel with one another and with the center line of the truck. In the present instance, the guard plates 16, 16 are reinforced, fore and aft, at both their inner and outer edges, by means of downturned fore and aft stiffening flanges 17, 17 and 18, 18. At their inner edges the guard plates 16, 16 are supported by attachment to the frame sides 9, 9, and at their outer edges by attachment to the outer ends of the axles 13, 13. For this purpose, securing bolts 19 take through the inner guard flanges 17, 17 and the corresponding flanges 20, 20 of the members 9, 9, while convergent supports 21, 21 extend downward from the outer corners of each plate 16 to a common apertured plate portion 22 that takes the corresponding axle end 13. This plate portion 22 may be secured on the axle end 13 by a cotter pin 23. The wheel 6 is kept from lateral peripheral contact with the guard supports 21, 21 by the projecting end of its hub 24, as shown in Fig. III.

As here shown, the supports 21, 21 and the apertured axle plate portion 22 for each guard plate 16 are formed by a portion of the latter bent downward and punched to lighten it and thereby afford the separate members 21, 21, attached at their upper ends to the outer flange 18. Thus the guard 16 as a whole is L-shaped. Practically, the guard plate 16 and its supports 21, 21 etc., may be initially formed by a single punching operation, followed by bending downward of its inner and outer portions as shown.

Having described my invention, I claim:

A truck of the character described comprising inverted channel side members or sills, brackets secured in said channel sills and projecting below them, a transverse axle carried by said brackets below said sills and projecting laterally beyond them, wheels on said axle outside said brackets and sills, and guards of L-bent sheet metal over said wheels, with downturned flanges on their inner margins secured to the outer sill-channel flanges, and with downturned outer portions apertured and secured on the outer ends of the axles, outside the wheels.

In testimony whereof, I have hereunto signed my name at Philadelphia, Pa., this 7th day of January, 1927.

FRANK T. EVERSON.